US012611080B2

(12) United States Patent
Hanslmeier

(10) Patent No.: US 12,611,080 B2
(45) Date of Patent: Apr. 28, 2026

(54) ARRANGEMENT OF A DE-DUSTING UNIT IN A VACUUMING DEVICE AND VACUUMING DEVICE WITH SUCH AN ARRANGEMENT

(71) Applicant: Hilti Aktiengesellschaft, Schaan (LI)

(72) Inventor: Xaver Hanslmeier, Mauerstettten (DE)

(73) Assignee: Hilti Aktiengesellschaft, Schaan (LI)

( * ) Notice: Subject to any disclaimer, the term of this patent is extended or adjusted under 35 U.S.C. 154(b) by 553 days.

(21) Appl. No.: 17/620,362

(22) PCT Filed: Jun. 10, 2020

(86) PCT No.: PCT/EP2020/066087
§ 371 (c)(1),
(2) Date: Dec. 17, 2021

(87) PCT Pub. No.: WO2020/254167
PCT Pub. Date: Dec. 24, 2020

(65) Prior Publication Data
US 2022/0240742 A1 Aug. 4, 2022

(30) Foreign Application Priority Data

Jun. 18, 2019 (EP) .................................... 19180880

(51) Int. Cl.
*B01D 46/00* (2022.01)
*A47L 9/10* (2006.01)
(Continued)

(52) U.S. Cl.
CPC ................. *A47L 9/20* (2013.01); *A47L 9/106* (2013.01); *B01D 46/58* (2022.01); *B01D 46/76* (2022.01); *B01D 46/90* (2022.01); *B01D 2279/50* (2013.01)

(58) Field of Classification Search
CPC ........ B01D 46/58; B01D 46/90; B01D 46/76; B01D 2279/50; B01D 2279/55; A47L 9/20; A47L 9/106; A47L 5/12
(Continued)

(56) References Cited

U.S. PATENT DOCUMENTS

| | | | | | |
|---|---|---|---|---|---|
| 3,805,494 | A | * | 4/1974 | Kroll | ...................... B01D 46/76 55/300 |
| 5,013,333 | A | * | 5/1991 | Beaufoy | ............... E01H 1/0854 55/300 |

(Continued)

FOREIGN PATENT DOCUMENTS

| | | |
|---|---|---|
| CN | 1683054 A | 10/2005 |
| CN | 1757370 A | 4/2006 |

(Continued)

OTHER PUBLICATIONS

PCT/EP2020/066087, International Search Report dated Jul. 31, 2020 (Two (2) pages).

*Primary Examiner* — T. Bennett Mckenzie
(74) *Attorney, Agent, or Firm* — Crowell & Moring LLP

(57) ABSTRACT

A de-dusting unit positionable in a vacuum chamber of a vacuuming device, where the vacuum chamber is delimited by a turbine, a first filter, and a second filter. The de-dusting unit includes a displacement module where the de-dusting unit is positionable within the vacuum chamber by the displacement module such that one of the first and second filters at a time is isolated from a suction flow and such that an oscillating movement of the de-dusting unit is transmitted to the isolated filter.

15 Claims, 6 Drawing Sheets

(51) Int. Cl.
| | |
|---|---|
| *A47L 9/20* | (2006.01) |
| *B01D 46/58* | (2022.01) |
| *B01D 46/76* | (2022.01) |
| *B01D 46/90* | (2022.01) |

(58) Field of Classification Search
USPC ...................................... 55/282–305; 95/282
See application file for complete search history.

(56)                    References Cited

U.S. PATENT DOCUMENTS

| | | | |
|---|---|---|---|
| 5,720,076 A * | 2/1998 | Clark ....................... A47L 9/009 |
| | | | 15/327.2 |
| 7,780,752 B2 | 8/2010 | Cha et al. | |
| 8,015,660 B2 | 9/2011 | Bruntner | |
| 8,142,554 B2 | 3/2012 | Eckstein et al. | |
| 8,940,064 B2 | 1/2015 | Hara et al. | |
| 2007/0000219 A1* | 1/2007 | Park ................... B01D 46/0005 |
| | | | 55/300 |
| 2007/0294857 A1 | 12/2007 | Heinrichs | |
| 2008/0115668 A1* | 5/2008 | Haavisto ................ B01D 46/04 |
| | | | 95/280 |
| 2009/0000485 A1* | 1/2009 | Valentini ................... A47L 9/20 |
| | | | 55/284 |
| 2009/0106933 A1 | 4/2009 | Bruntner | |
| 2011/0226130 A1 | 9/2011 | Kienzle et al. | |

| | | | |
|---|---|---|---|
| 2012/0090640 A1* | 4/2012 | Rentschler ............. B01D 46/46 |
| | | | 134/21 |
| 2014/0102053 A1* | 4/2014 | Vetse .................... B01D 46/76 |
| | | | 55/304 |
| 2017/0020352 A1 | 1/2017 | Amisani et al. | |

FOREIGN PATENT DOCUMENTS

| | | | | |
|---|---|---|---|---|
| CN | 1951300 A | 4/2007 | | |
| CN | 101088449 A | 12/2007 | | |
| CN | 101313833 A | 12/2008 | | |
| CN | 102469902 A | 5/2012 | | |
| CN | 105688542 A | 6/2016 | | |
| CN | 207554988 U | 6/2018 | | |
| CN | 109731412 A | 5/2019 | | |
| DE | 202004012911 U1 * | 10/2004 | ......... B01D 46/2411 |
| DE | 20 2007 015 242 U1 | 1/2008 | | |
| EP | 1 629 762 A2 | 3/2006 | | |
| EP | 2 052 660 A2 | 4/2009 | | |
| EP | 2749193 A1 * | 7/2014 | ............ A47L 9/127 |
| EP | 3 146 881 A1 | 3/2017 | | |
| EP | 3420874 A1 * | 1/2019 | ......... B01D 46/4272 |
| JP | 4716272 B2 | 10/2002 | | |
| JP | 2013-128565 A | 7/2013 | | |
| JP | 2019-7636 A | 1/2019 | | |
| WO | WO 2008/014797 A1 | 2/2008 | | |
| WO | WO 2012/017606 A1 | 2/2012 | | |

* cited by examiner

ARRANGEMENT OF A DE-DUSTING UNIT IN A VACUUMING DEVICE AND VACUUMING DEVICE WITH SUCH AN ARRANGEMENT

BACKGROUND AND SUMMARY OF THE INVENTION

The present invention relates to an arrangement of a de-dusting unit in a vacuuming device. In this case, the de-dusting unit is in a vacuum chamber of the vacuuming device and can be moved by a displacement module into various positions within the vacuum chamber, which is formed by a turbine and at least two filters. As a result, the de-dusting unit can be positioned within the vacuum chamber in such a way that one filter at a time can be isolated from a suction flow and an oscillating movement of the de-dusting unit can be transmitted to the isolated filter. In further aspects, the invention relates to a vacuuming device, which comprises a provided arrangement of a de-dusting unit, and also to a method for filter de-dusting.

The prior art discloses vacuuming devices that are for example used on construction sites for collecting dust. Such vacuuming devices are preferably also referred to as construction-grade vacuuming devices. When collecting the dust, a vacuum is produced within the construction-grade vacuuming device by means of a turbine and, by means of a suction flow, the vacuum sucks the dust to be collected into a dust collecting container, which is often arranged in the lower region of the construction-grade vacuuming device, where the dust stays until the dust collecting container is emptied. In order to protect the motor of the vacuuming device from contamination and mechanical impairment by the dust collected, vacuuming devices have filters, which in the course of operation may become clogged with dust. In particular, there may form a so-called filter cake, which is very compact and firmly attaches itself to the material of the filter. It is known that the filters of a vacuuming device have to be regularly cleaned in order to avoid such undesired clogging of the filters. Regular cleaning of the filters of a vacuuming device is preferably referred to in the context of the present invention as filter de-dusting.

In the case of conventional vacuuming devices that are known from the prior art, the de-dusting usually takes place by the direction of flow of the suction flow being briefly reversed in the process of a backflushing. The backflushing is based in particular on a pressure gradient, a sudden opening of a flap or an opening in the vacuuming device causing a pressure equalization, which leads to the backflushing. A disadvantage of this filter de-dusting method is that there is a blowback in the suction system, which can impair the extraction performance of the vacuuming device. A design of the vacuuming device with two filters can reduce this problem of blowback, but not compensate for it entirely.

A further disadvantage of known filter de-dusting methods is that unfiltered ambient air is often used as flushing air. It may in this case happen that long-term damage to the components or the vacuuming device may be caused by contaminants possibly contained in the ambient air, which deposit dust and or contaminants on components involved in the filter de-dusting.

Another known method for filter de-dusting is that of using vibrations to produce knocking movements, with which the filter is de-dusted. This vibratory de-dusting has the advantage over backflushing that it can be performed by the vacuuming device independently of the pressure and operating point. If the vacuuming device is de-dusted by vibrations, isolating the filter from the suction flow can have positive effects on the de-dusting result. This is in particular because it avoids a screening effect or the production of an air flow. However, in the case of vacuuming devices with one filter, the isolation causes an undesired interruption of the suction process. In the case of vacuuming devices with more than one filter, disadvantageously an isolating valve and a corresponding separate actuator have to be provided for each filter, making the structure of the vacuuming device complicated and susceptible to faults.

If two filters are used, it is true that the vacuuming device can use parallel suction and the filters of the vacuuming device can be de-dusted alternately. However, the vibration method involves the disadvantage that the components of the vacuuming device are exposed to high impact loading, this impact loading also disadvantageously taking the form of a single-axis impact loading.

The object of the invention is to overcome the disadvantages and drawbacks of the prior art described above and to provide an arrangement of a de-dusting unit for a vacuuming device, so that it is possible with the vacuuming device to perform the suction process and at the same time de-dust at least one filter. In particular, it is intended with the invention to avoid a loss of performance with respect to the suction power during the de-dusting operation and to make multi-axis filter cleaning possible. In addition, the vacuuming device to be provided is intended to comprise the fewest possible components, in order to require little maintenance and be as insusceptible as possible to faults.

The object is achieved by an arrangement of a de-dusting unit in a vacuuming device. The arrangement is characterized in that the de-dusting unit is in a vacuum chamber of the vacuuming device, the vacuum chamber being delimited by a turbine and a first filter and a second filter, the de-dusting unit comprising a displacement module which is designed to position the de-dusting unit within the vacuum chamber in such a way that one filter at a time can be isolated from a suction flow and an oscillating movement of the de-dusting unit can be transmitted to the isolated filter.

It is preferred for the purposes of the invention that the oscillation is produced by preferably two eccentrics, which according to a preferred configuration of the invention rotate preferably with an offset of substantially 180 degrees in relation to one another and in the same direction. As a result, centrifugal forces occurring in the longitudinal axis can compensate for one another, while the centrifugal forces in the transverse axis supplement one another to form a rotational force, which can be advantageously used as a de-dusting force. In other words, the force that is produced by the overlaying of the centrifugal forces of the two eccentrics in the transverse axis can be used for the purpose of filter de-dusting. It is preferred for the purposes of the invention that the rotational movement of the eccentrics, preferably in the same direction, has the effect of producing a translatory linear movement of the de-dusting unit, which for the purposes of the invention is preferably also referred to as a back-and-forth movement or right-and-left movement. In particular, for the purposes of the invention, the right-and-left movement takes the form of an oscillating movement, which can be transmitted from the de-dusting unit to the filters, so that the filters are de-dusted by the oscillations. Preferably, the oscillating movement is characterized by frequency and amplitude values which can be selected and set in dependence on parameters that describe the vacuuming device or its geometry or its dimensions.

The invention advantageously provides a de-dusting mechanism that overcomes the disadvantages of the prior art. In particular, the invention can provide a de-dusting unit which, instead of a simple vibration, produces an oscillating movement that serves for de-dusting the filters in the vacuuming device. As a result, a multi-axis cleaning of the filters is made possible as a particular advantage of the invention. Preferably, the provided arrangement of a de-dusting unit in a vacuuming device takes the form of a particularly simple arrangement which requires little maintenance and is not susceptible to faults. In particular, the production costs for vacuuming devices that have a corresponding de-dusting arrangement can be significantly reduced in comparison with the production costs for conventional vacuuming devices. The invention departs from the prior art in that oscillations are used in the context of the present invention instead of the otherwise customary vibrations for filter de-dusting. In particular, it was surprising for those skilled in the art that oscillations can be produced within a vacuuming device and transmitted to the filters in such a way that effective and efficient filter cleaning can be accomplished, in particular also for those vacuuming devices that have two filters. It had previously been assumed by those skilled in the art that, for effective filter de-dusting of more than one filter in a vacuuming device, more than one de-dusting device must be provided. The invention is accordingly accompanied by the advantage that only one de-dusting unit is to be provided for the efficient de-dusting of two filters.

A further advantage of the invention is that, with the provided arrangement, a multi-axis de-dusting movement of the filter elements can be made possible. It may however also be preferred in some application areas of the invention that a single-axis movement of the filter elements is used for the de-dusting.

In addition, the oscillating movement with which the filter cleaning is performed in the context of the present invention has been found to be particularly gentle on materials in comparison with the vibrations known from the prior art. A further advantage of the invention is that the filter de-dusting can be carried out pressure-independently. Surprisingly, particularly low-noise de-dusting technology can be provided by the provided arrangement, which in particular manages without disturbing knocking noises.

It is preferred in particular for the purposes of the invention that a vacuuming device comprises a displacement module of such a form and a de-dusting unit of such a form that there is no need for double provision of these components of the vacuuming device. In particular, the provision of a displacement module and a de-dusting unit for each filter can be avoided by the invention. Consequently, in the context of the provided invention, in particular only one displacement module is provided for two filters. In addition, also only one de-dusting unit is provided for the two filters. As a result, in particular a simple structure of the vacuuming device is made possible.

Preferably, the de-dusting unit is formed movably within the vacuum chamber of the vacuuming device, so that it can be made to undergo movements by the displacement module. These may be for example vertical movements along an imaginary, preferably substantially horizontally extending axis ("linear solution") or a rotational movement about a point of rotation ("rotary solution"). In particular, the rotatable configuration of the de-dusting unit in conjunction with the displaceable module brings about some of the technical advantages of the invention.

It is preferred for the purposes of the invention that the de-dusting unit comprises two eccentrics, which are designed to produce the oscillating movement by their rotational movements. Preferably, the eccentrics are designed to perform rotational movements in the same direction. In other words, the two eccentrics rotate in the same direction of rotation, as is indicated in the figures by the arrows. It is most particularly preferred for the purposes of the invention that the eccentrics rotate with an offset of 180° or half a revolution in relation to one another. This offset with respect to the rotational movements of the two eccentrics preferably has the effect that the centrifugal forces of the eccentrics cancel one another out or that the centrifugal forces compensate for one another. In other words, the rotational movements of the eccentrics can have the effect of compensating for the centrifugal forces of the rotating eccentrics in the horizontal, and vice versa. This preferably causes a torque in the vertical, which brings about the oscillating movement of the de-dusting unit. It is preferred for the purposes of the invention that between the two eccentrics there may be arranged a drive device, which is preferably designed to drive the two eccentrics.

If the filters are arranged within the vacuum chamber of the vacuuming device along a substantially imaginary horizontal line or straight line ("linear solution"), a horizontal plane can thus be defined by the filters, which may be parallel to the movements of the de-dusting unit. Such movements are preferably referred to for the purposes of the invention as "vertical movements" or "lateral movements". It is preferred in particular for the purposes of the invention that the de-dusting unit is capable of performing such vertical movements, the vertical movements preferably being brought about by the displacement module. The vertical movements of the de-dusting unit within the vacuum chamber preferably occur between the filters of the vacuuming device. The vertical movement of the de-dusting unit is preferably caused in particular by a torque acting in the vertical direction, which is produced by the compensatory effect of the centrifugal forces within the de-dusting unit. It is preferred in particular for the purposes of the invention that the vertical movement of the de-dusting unit is brought about by the displacement module. It is preferred in particular for the purposes of the invention that a rotational movement of the eccentric unit of the de-dusting unit is transformed into a rotational movement of the filter. For the purposes of the invention, the eccentric unit of the de-dusting unit may preferably also be referred to as the oscillation module of the vacuuming device.

The displacement module may be formed for example by an actuator, which preferably comprises an electromagnet. The electromagnet may preferably be activated from two sides. For example, the de-dusting device may be moved laterally back and forth by means of the displacement module. For the purposes of the invention, these movements of the de-dusting device are preferably referred to as vertical movements. Furthermore, the displacement module may comprise spring elements, which exert a restoring force on the de-dusting unit, so that the vertical movement of the de-dusting unit are advantageously assisted.

It is preferred for the purposes of the invention that the de-dusting unit has a first and a second tappet, the first tappet being designed to seal off an inlet of the first filter and the second tappet being designed to seal off an inlet of the second filter. As a result, by the provision of the tappets in combination with the movement of the de-dusting unit, the filters can be advantageously separated from the vacuum chamber. In particular, the separation of the filter and the vacuum chamber allows the isolation of the filters with respect to the suction flow to be achieved, the suction flow preferably flowing through the vacuum chamber. The suction flow is preferably caused by the vacuum, which can be produced by the turbine of the vacuuming device. By means of the suction flow, the vacuuming device is preferably designed to collect dust that occurs or is produced for example during work with a power drill or a core drill. It is in this way advantageously avoided that the dust gets into the airways of a user.

In addition, the tappets of the de-dusting unit are designed to transmit the oscillating movement of the de-dusting unit to the filters. This preferably achieves the de-dusting effect of the de-dusting unit. Preferably, the filters are shaken through by the oscillating movements, so that the dust or a filter cake that has possibly formed is shaken loose. This shaking movement can have the effect that the dust or the filter cake falls into the dust collecting container in the lower region of the vacuuming device. The transmission of the oscillating movement preferably takes place due to a form fit between the tappets and the inlets of the filters. The two tappets preferably form a lateral termination of the de-dusting unit, the tappets transmitting the oscillating movement of the de-dusting unit to the filters, for which the form fit between the tappets and the filters is preferably used.

It is preferred for the purposes of the invention that, in the case of a linear solution, the de-dusting unit is arranged substantially between the filters. For the purposes of the invention, the linear solution is preferably characterized in that the filters, which preferably delimit the vacuum chamber of the vacuuming device together with the turbine, are arranged substantially along a horizontally extending imaginary line or straight line. In other words, the filters may define an imaginary line that preferably extend substantially parallel to an underlying surface on which the vacuuming device is placed. In the case of the linear solution, the filters of the vacuuming device are preferably arranged on opposite sides or side walls of the vacuum chamber, it being possible in particular for the filters to be arranged substantially parallel to one another. The filters, preferably arranged in parallel, are preferably arranged in a lower region of the vacuum chamber, while the turbine of the vacuuming device forms an upper termination of the vacuum chamber. In the context of the present invention, the terms "upper" and "lower" are not unclear concepts for a person skilled in the art. A lower region of the vacuuming device or of the vacuum chamber is preferably characterized in that it is arranged closer to the underlying surface than an upper region of the vacuuming device or the vacuum chamber, which for its part is at a greater distance from the underlying surface on which the vacuuming device is placed.

The filters preferably open out into the vacuum chamber of the vacuuming device in each case with an inlet region. For the purposes of the invention, these inlet regions are preferably referred to as filter inlets. It is preferred for the purposes of the invention that a first filter of the vacuuming device or a first filter inlet forms a form fit with the first tappet of the de-dusting unit, whereby the oscillations of the de-dusting unit can be transmitted to the first filter. By analogy, a second filter of the vacuuming device or a second filter inlet may enter into a form fit with the second tappet of the de-dusting unit, whereby the oscillations of the de-dusting unit can be transmitted to the second filter. Furthermore, the form fit has the effect that the respective filter is sealed off with respect to the vacuum chamber and is separated from the suction flow within the chamber. For the purposes of the invention, this separation is preferably also referred to as isolation. Preferably, at a point in time t1 during the operation of the vacuuming device, one of the filters is separated from the vacuum chamber, whereas, at a point in time t2, the other filter may be separated from the vacuum chamber. It is most particularly preferred for the purposes of the invention that the separated or isolated filter is in each case de-dusted during the phase of being separated. In other words, it is preferred for the purposes of the invention that the isolated filter is in each case de-dusted during its isolation from the suction flow. There may also be times ti at which both filters are connected to the vacuum chamber and the suction flow. In this case, both filters are subjected to the vacuum that prevails in the vacuum chamber and both filters can contribute to the cleaning of the air flow within the vacuuming device. For example, in a time period $\Delta t$Bew, which for example comprises a point in time ti, the de-dusting unit may move through the vacuum chamber from one side to the other side, the tappets of the de-dusting unit preferably not being in contact with the inlets of the filters during the time period $\Delta t$Bew. In other words, it is preferred for the purposes of the invention that, during the time period $\Delta t$Bew, a vertical movement of the de-dusting unit takes place within the vacuum chamber of the vacuuming device. In particular, it is preferred that during the operation of the vacuuming device there are operating or de-dusting cycles in which firstly, during a time period $\Delta t1$, the first filter is de-dusted. In this time period $\Delta t1$, there is preferably a form fit between the first tappet of the de-dusting unit and the inlet of the first filter, which for the purposes of the invention is preferably also referred to as the "first filter inlet". During the time period $\Delta t1$, preferably the first filter is de-dusted, whereas the second filter is available for filtering the suction flow. Subsequently, during the time period $\Delta t$Bew, the de-dusting unit moves with a vertical movement from the first filter on one side of the vacuum chamber to the second filter, which is preferably arranged on the other side of the vacuum chamber. During the time period $\Delta t$Bew, no filter de-dusting takes place and both filters of the vacuuming device are available for filtering purposes. This is followed by a time period $\Delta t2$, in which the second tappet of the de-dusting unit enters into a form fit with the second filter inlet, i.e., the inlet of the second filter, so that the second filter is separated from the suction flow. In this time period $\Delta t2$, preferably the second filter is de-dusted, whereas the first filter is available for filtering the suction flow. The de-dusting of the filters takes place in particular by the transmission of oscillating movements from the de-dusting unit to the filter respectively to be de-dusted.

The tappets of the de-dusting unit preferably have a flat or planar underside, with which they are facing the eccentric unit of the de-dusting unit. In the case of the linear solution, the substantially flat underside and a side wall of the eccentric unit are preferably formed substantially parallel to one another. In other words, the undersides of the tappets are at all points at a substantially equal distance from the side wall of the eccentric unit of the de-dusting unit that they are facing. The eccentric unit of the de-dusting unit is preferably that region of the de-dusting unit that preferably has two eccentrics. The tappets have on their side facing away from the eccentric unit or the de-dusting unit a rounded external form, which may for example correspond to a region of circumference of a circle.

It is preferred for the purposes of the invention that, in the case of a rotary solution, the de-dusting unit is arranged substantially above the filters. In other words, it is preferred for the purposes of the invention that, in the case of a linear solution, the de-dusting module is arranged between the filters, whereas, in the case of the rotary solution, the de-dusting unit is arranged over or above the filters. The rotary solution is preferably characterized in that the filters of the vacuuming device are arranged on opposite sides of the vacuum chamber, the filters being arranged in particular in a lower region of the vacuum chamber, whereas the turbine of the vacuuming device preferably forms an upper termination of the vacuum chamber. Preferably, the filters of the vacuuming device are arranged obliquely, the filters being at a smaller distance from one another in a lower region than in an upper region. In other words, in a preferred exemplary embodiment of the invention, the filters may form angles of inclination alpha and beta with an imaginary horizontal plane, which is preferably formed substantially parallel to an underlying surface on which the vacuuming device stands. The angle of inclination alpha preferably describes the oblique position of the second filter within the vacuuming device, whereas the angle beta describes the oblique position of the first filter within the vacuuming device. Preferably, the angles of inclination of the first filter and the second filter can be linked together by the relationship:

$$beta = 180° - alpha.$$

It is preferred for the purposes of the invention that the angles of inclination alpha and beta are secondary angles and complement one another to form 180°. It is particularly preferred for the purposes of the invention that the filters in each case form an acute angle with a horizontal plane within the vacuuming device.

It is preferred in the context of the rotary solution that the de-dusting unit is connected by way of a connecting means to the displacement module and also to one of the two filter inlets. In a preferred exemplary embodiment of the invention, the de-dusting unit may be connected by way of the displacement module for example to the inlet of the second filter. The connecting means may for example comprise a point of rotation about which the de-dusting unit can rotate when it is moved by the displacement module. This rotational movement of the de-dusting unit can make the tappets enter into a form fit with the filter inlets, seal them off and transmit the oscillating movements to the filters.

The inlet regions of the filters are preferably formed in each case by two side components, which extend obliquely toward one another from corner or edge points of the filters in the direction of the vacuum chamber. In this case, the two mutually facing side components of the first and second filters may be arranged substantially parallel to one another or substantially perpendicular to a virtual horizontal plane. These mutually facing side components of the first and second filters are preferably also referred to for the purposes of the invention as inner side components of the filter inlets, whereas the other side components respectively of the filters or filter inlet region are preferably referred to as outer side components. The side components of the filters may be connected to one another by an elastic suspension. In other words, it is preferred for the purposes of the invention that the side components of the filter elements in a transitional region with respect to the side or delimiting walls of the vacuum chamber comprise means for the elastic suspension of the filters.

In a preferred exemplary embodiment of the invention, the displacement module is in particular connected to the inner side component of the second filter. In the context of the rotary solution, the displacement module is preferably designed to bring about a tipping or rotational movement of the de-dusting unit within the vacuum chamber of the vacuuming device. A rotational movement may take place for example about a point of rotation. For example, the de-dusting module may be tipped or turned in such a way that the first tappet of the de-dusting unit enters into a form fit with the inlet of the first filter of the vacuuming device. As a result, the oscillating movements that are produced by the de-dusting unit can be transmitted to the first filter, so that a de-dusting of the first filter is brought about. This may take place for example during a time period $\Delta t1$. In this time period $\Delta t1$, the first filter is preferably isolated from the vacuum chamber and the suction flow flowing there, so that in this time period $\Delta t1$ the first filter does not contribute to the cleaning of the suction flow air. By analogy, in the case of the rotary solution, the de-dusting unit may be tipped or turned in such a way that the second tappet enters into a form fit with the second filter inlet. As a result, during a time period $\Delta t2$, the oscillating movements that are produced by the de-dusting unit can be transmitted to the second filter, so that a de-dusting of the second filter is brought about. In this time period $\Delta t2$, the second filter is preferably isolated from the vacuum chamber and the suction flow prevailing there, i.e., for the purposes of the invention is preferably isolated. As a result, in the time period $\Delta t2$, the second filter cannot contribute to the cleaning of the suction flow air. Preferably, in a time period $\Delta tBew$, no filter de-dusting takes place, since in this time period the de-dusting unit is transferred or moved from a first de-dusting position into a second de-dusting position. This preferably takes place by a vertical movement or a rotational movement of the de-dusting unit. The term "first de-dusting position" preferably describes the state in which the de-dusting unit or its first tappet is in a form fit with the first filter inlet. This first de-dusting position may be adopted in particular during the time period $\Delta t1$ in which the first filter is de-dusted. By analogy, the term "second de-dusting position" may preferably be used to describe the state in which the de-dusting unit or its second tappet is in a form fit with the inlet of the second filter. This second de-dusting position may be adopted in particular during the time period $\Delta t2$ in which the second filter is de-dusted.

It is preferred for the purposes of the invention that—in particular in the context of the rotary solution—the tappets may be arranged tipped with respect to the eccentric unit of the de-dusting unit. In this exemplary embodiment of the invention, the undersides of the tappets that are facing the eccentric unit do not extend parallel to the side walls of the eccentric unit. The tipping of the tappets makes a better form fit between the tappets and the filter inlets possible, so that in this way particularly sealed isolation or effective separation of the filters from the vacuum chamber can be achieved, in order to make a de-dusting of the filters possible without impairing the vacuum within the vacuum chamber that is required for collecting dust. The provision of a preferably alternately operating de-dusting of two filters in a vacuuming device with only one de-dusting module, which is preferably designed to alternately isolate one or the other filter from the suction flow of the vacuuming device represents a particular merit of the present invention.

It is preferred for the purposes of the invention that the three components that delimit the vacuum chamber, in particular the turbine, the first filter and the second filter, are connected to one another by delimiting or side walls, so that a hollow space which is designed to withstand a vacuum that is preferably produced by the turbine of the vacuuming device is formed by the components in conjunction with the side walls.

In a second aspect, the invention relates to a vacuuming device which comprises an arrangement of a de-dusting unit as claimed in one of the preceding claims. The provided vacuuming device has in particular a movably configured de-dusting unit, which can move back and forth between various positions within a vacuum chamber of the vacuuming device, so that at different times t either one filter (for example "first de-dusting position") or the other filter (for example "secondary de-dusting position") or no filter ("middle position") is de-dusted.

In a further aspect, the invention relates to a method for de-dusting filters in a vacuuming device, with oscillating movements being transmitted to the filters by a de-dusting unit within the method. The definitions, technical effects and advantages that have been described for the de-dusting arrangement apply analogously to the vacuuming device and the de-dusting method. In particular, a de-dusting method in which a de-dusting unit can assume various positions in a vacuum chamber of the vacuuming devices is provided, wherein, in a first or second de-dusting position, oscillating movements can be transmitted to the first or second filter of the vacuuming device and wherein, in a middle position, no filter de-dusting takes place and both filters are available for the cleaning of the air of the suction flow in the vacuum chamber of the vacuuming device. Preferably, in the first or second de-dusting position, the de-dusting unit is in contact with the first or the second filter of the vacuuming device. In particular, in each case a form fit may be formed between the first tappet of the de-dusting unit and the inlet of the first filter or a form fit may be formed between a second tappet of the de-dusting unit and the inlet of the second filter of the vacuuming device. It is preferred for the purposes of the invention that the oscillating movements can be transmitted by means of the form fit from the de-dusting unit to the filters. The oscillating movements are preferably formed by an eccentric unit, which may preferably comprise two eccentrics. These eccentrics turn to produce the oscillations, the eccentrics preferably rotating in the same direction, but with an offset of substantially 180 degrees in relation to one another. The provided de-dusting method can preferably be described by the following steps:

a) provision of a vacuuming device comprising a de-dusting unit, the de-dusting unit being initially arranged in a middle position in a vacuum chamber, so that air of a suction flow is cleaned by filters during the operation of the vacuuming device, b) movement of the de-dusting unit within the vacuum chamber of the vacuuming device, so that a first or a second de-dusting position is assumed, c) a form fit between the de-dusting unit and an inlet of the first or the second filter, d) transmission of oscillating movements from the de-dusting unit to the first or the second filter, the first or the second filter being de-dusted by the oscillating movements, e) movement of the de-dusting unit into the middle position or into the other de-dusting position, respectively.

It can be advantageously ensured by the invention that dust can be optimally collected by the vacuuming device at all operating times, without impairment of the suction performance at those times in which the filters of the vacuuming device are de-dusted, as is the case in conventional vacuuming devices. This is either achieved by the de-dusting unit being in the middle position and both filters being available for cleaning the air in the suction flow. Alternatively, the de-dusting unit may be in one of the two de-dusting positions, in which one of the two filters in each case is de-dusted. Preferably, during the de-dusting of one filter, the other filter respectively is available for the filtration of the suction flow air, so that advantageously dust collection by the vacuuming device can take place at the same time as the de-dusting of a filter of the vacuuming device, without there being a significant loss of suction, which could have disadvantageous effects on the suction power and/or the dust collection. Another surprising advantage of the invention is that, within the provided method, only one de-dusting unit has to be provided, although for example two filters are to be de-dusted. It had previously been assumed by those skilled in the art that, for example when using two filters, two de-dusting units must also be provided. These advantages of the invention are made possible in particular by the movably formed de-dusting unit, which—preferably driven by the displacement module—move within the vacuum chamber of the vacuuming device and can assume various functional positions within the vacuuming device. The vacuum chamber is preferably formed by a turbine and the at least two filters of the vacuuming device, the de-dusting unit being preferably formed movably in such a way that it may either be in a middle position in the vacuum chamber, so that all of the filters are connected to the vacuum chamber in a fluid-conducting manner, or that the de-dusting unit may be in one of the two de-dusting positions, in each of which one of the two filters is isolated from the suction flow, so that a filter de-dusting can be carried out during the isolation of the filter from the suction flow. This filter de-dusting preferably takes place by using oscillating movements, it being possible for example for the oscillating movements to be transmitted to the filters by tappets of the de-dusting unit.

Preferably, the first filter is de-dusted in a first de-dusting position and the second filter of the vacuuming device in a second de-dusting position of the de-dusting unit. It is preferred for the purposes of the invention that, after de-dusting of the first filter has taken place, the de-dusting unit can move from a first de-dusting position into a middle position or the second de-dusting position. It may be preferred for the purposes of the invention that, after de-dusting of a filter has taken place, the de-dusting unit goes over directly into the other de-dusting position. The time period in which the de-dusting unit moves from the first into the second de-dusting unit may preferably be referred to for the purposes of the invention as $\Delta t_{Bew}$. It may however also be preferred that the de-dusting unit stays in a middle position and only assumes the second de-dusting position at a later point in time. It is preferred for the purposes of the invention that the control of the de-dusting unit takes place in a way corresponding to a de-dusting requirement of the filters. It may however also be preferred that a time control or control on the basis of further parameters is used.

It is most particularly preferred for the purposes of the invention that a transmission of the oscillating movements takes place due to a form fit between the de-dusting unit and the filter extraction channels or the filter inlets of the filters. This form fit may be formed in particular by the tappets of the de-dusting unit and by the filter inlets. Preferably, the de-dusting of the second filter may take place after carrying out method step e), when the de-dusting unit is moved by the displacement module into the second de-dusting position. Step e) can then be repeated, for example up until when the operation of the vacuuming device is ended. It is preferred for the purposes of the invention also to refer to the filter inlets as suction channels or extraction channels.

Further advantages of the invention will become apparent from the following description of the figures. Various exemplary embodiments of the present invention are represented in the figures. The figures, the description and the claims contain numerous features in combination. A person skilled in the art will expediently also consider the features individually and combine them to form useful further combinations.

DETAILED DESCRIPTION OF THE DRAWINGS

In the figures, identical and similar components are denoted by the same reference signs.

Figure 1:
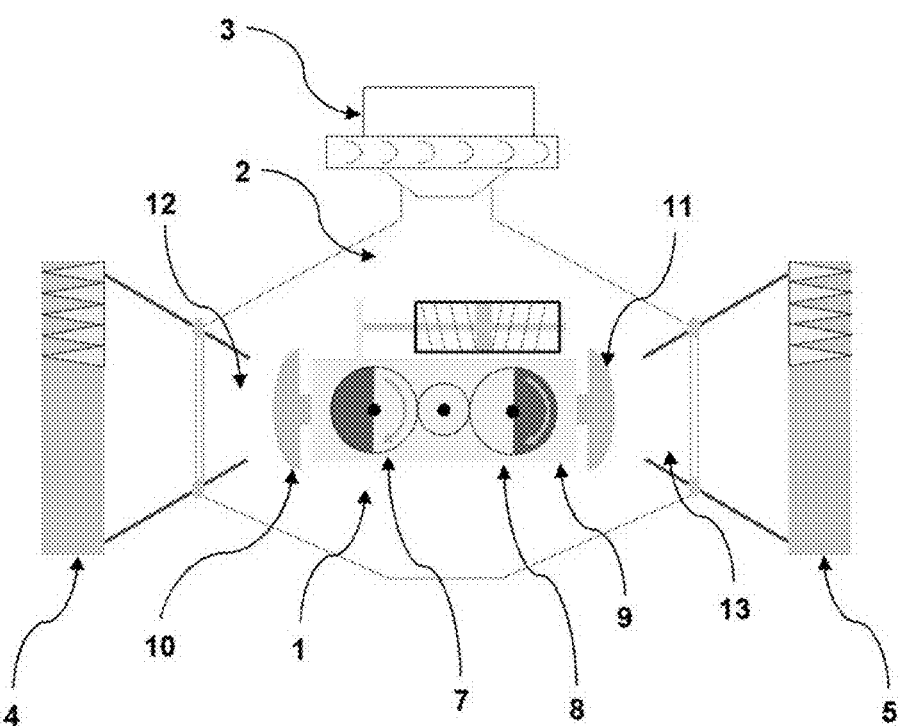
FIG. 1 shows a view of a preferred embodiment of the invention, in particular an arrangement of the de-dusting unit and the filters according to the linear solution.

FIG. 1 shows a preferred configuration of the arrangement of a de-dusting unit (1) in a vacuuming device (not represented). In particular, FIG. 1 shows a first filter (4) and a second filter (5), which together with a turbine (3) enclose a vacuum chamber (2) in the interior of the vacuuming device. In the exemplary embodiment of the invention that is represented in FIG. 1, the filters (4 and 5) are arranged in a linear solution, which is preferably characterized in that the filters (4 and 5) are arranged substantially parallel to one another in a lower region of the vacuum chamber (2). Arranged in the vacuum chamber (2) is a preferably movably configured de-dusting unit (1), which comprises an eccentric unit (9), and also a first tappet (10) and a second tappet (11). In addition, the vacuum chamber (2) is surrounded by side walls, which connect the turbine (3) and the filters (4 and 5) to one another. The eccentric unit (9) preferably has two eccentrics (7 and 8), which can preferably rotate in the same direction, but with an offset of 180° in relation to one another. This mutually offset rotation of the preferably two eccentrics (7 and 8) allows the centrifugal forces that are produced by the rotational movements of the eccentrics (7 and 8) to compensate for one another. The rotational movements of the eccentrics (7 and 8) advantageously have the effect of producing a torque, with which for its part oscillating movements can be produced. These oscillating movements can be transmitted by the tappets (10 and 11) to the filters (4 and 5) of the vacuuming device, whereby a de-dusting of the filters (4 and 5) is brought about. In particular, the tappets (10 and 11) are designed to close off the inlets (12 and 13) of the filters (4 and 5) with respect to the vacuum chamber (2). This air-tight or pressure-tight termination is preferably referred to for the purposes of the invention as isolation of the filters (4 and 5) from a suction flow within the vacuum chamber (2) of the vacuuming device. Preferably, the first tappet (10) can close the first filter inlet (12), whereas the second tappet (11) is designed to close the second filter inlet (13). In the arrangement of the de-dusting unit (1) that is represented in FIG. 1, the de-dusting unit (1) is in a middle position, in which both filters (4 and 5) are available for the cleaning of the air in the suction flow and in which no filter de-dusting takes place. The de-dusting unit (1) can be transferred by a displacement module (6) from the middle position into a first de-dusting position (see FIG. 2) or into a second de-dusting position (see FIG. 3). For this purpose, a vertical movement ("linear solution") or a rotational movement ("rotary solution") of the de-dusting unit (1) is brought about by means of the displacement module (6).

Also represented in FIG. 1 are elastic suspensions (14), which can preferably be used to fasten the filters (4 and 5) within the vacuuming device. Between the eccentrics (7 and 8) there may be arranged a drive device (15), with which the two eccentrics (7 and 8) can be driven.

Figure 2:
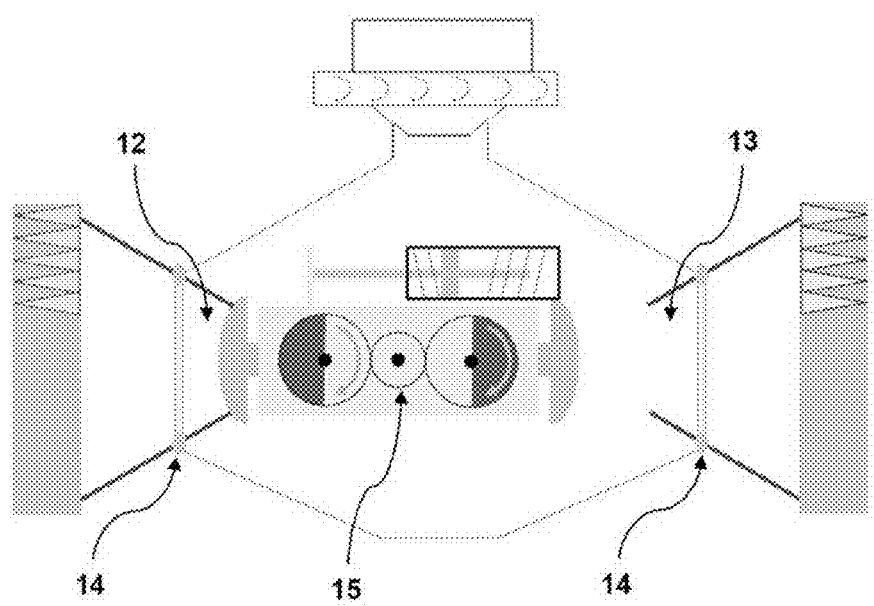
FIG. 2 shows a representation of a first de-dusting position of the de-dusting unit, in which the first filter is de-dusted.

FIG. 2 shows a de-dusting unit (1) in a first de-dusting position, in which the first filter (4) is de-dusted. In this position, the first tappet (10) closes the inlet (12) of the first filter (4) and thus separates it from the vacuum chamber (2). This isolation is preferably achieved by a form fit. In the time period in which the first filter (4) is isolated from the suction flow in the vacuum chamber (2) by the first tappet (10), a de-dusting of the first filter (4) can be advantageously carried out, the first filter (4) not being available in this time for the cleaning of the air of the suction flow in the vacuum chamber (2). In particular, the de-dusting unit (1) is moved from one position into another position by the displacement module (6). This change of position preferably takes place by a vertical movement or a rotational movement of the de-dusting unit (1).

In the first de-dusting position, the oscillating movements that are produced by the rotational movements of the eccentrics (7 and 8) can be transmitted to the filters (4 and 5) by means of the tappets (10 and 11), whereby the filters (4 and 5) are de-dusted. The tappets (10 and 11) may have a rounded front side, in each case facing a filter (4 or 5) or a filter inlet (12 or 13). On the side facing the eccentric unit (9), the tappets (10 and 11) preferably have planar undersides, which are arranged substantially parallel to the side walls of the eccentric unit (9).

Figure 3:
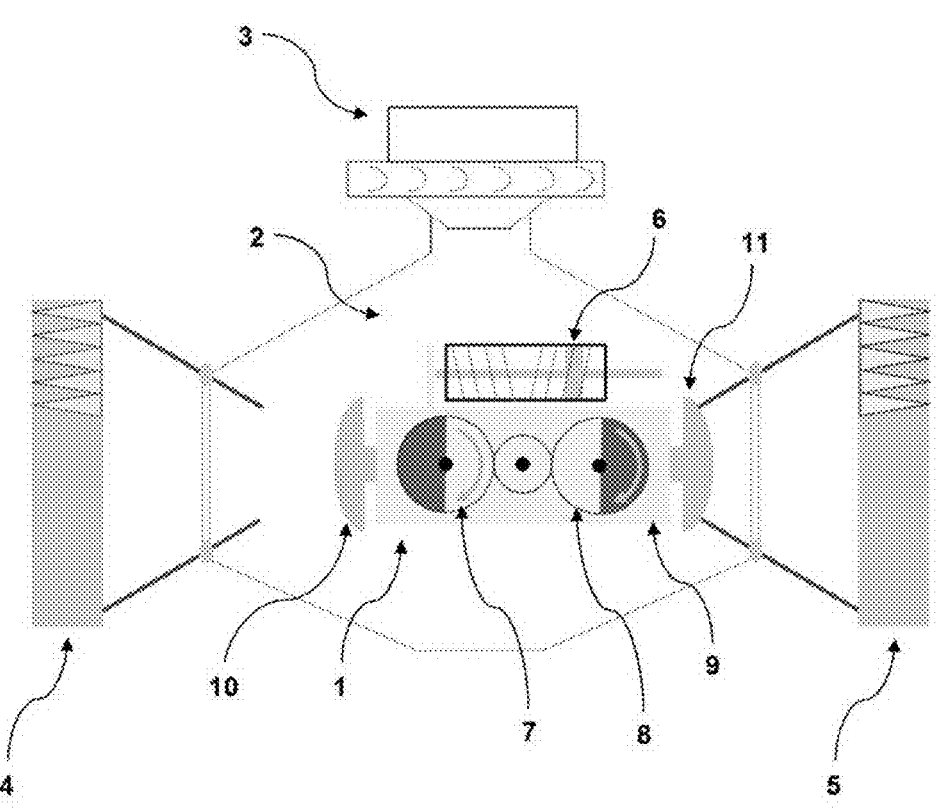
FIG. 3 shows a representation of a second de-dusting position of the de-dusting unit, in which the second filter is de-dusted.

FIG. 3 shows a de-dusting unit (1) in a second de-dusting position, in which the second filter (5) is de-dusted. In this position, the second tappet (11) closes the inlet (13) of the second filter (5) and thus separates it from the vacuum chamber (2). In the time period in which the second filter (5) is isolated from the suction flow in the vacuum chamber (2) by the second tappet (11), a de-dusting of the second filter (5) can preferably be carried out, the second filter (5) not being available in this time for the cleaning of the air of the suction flow in the vacuum chamber (2).

Figure 4:
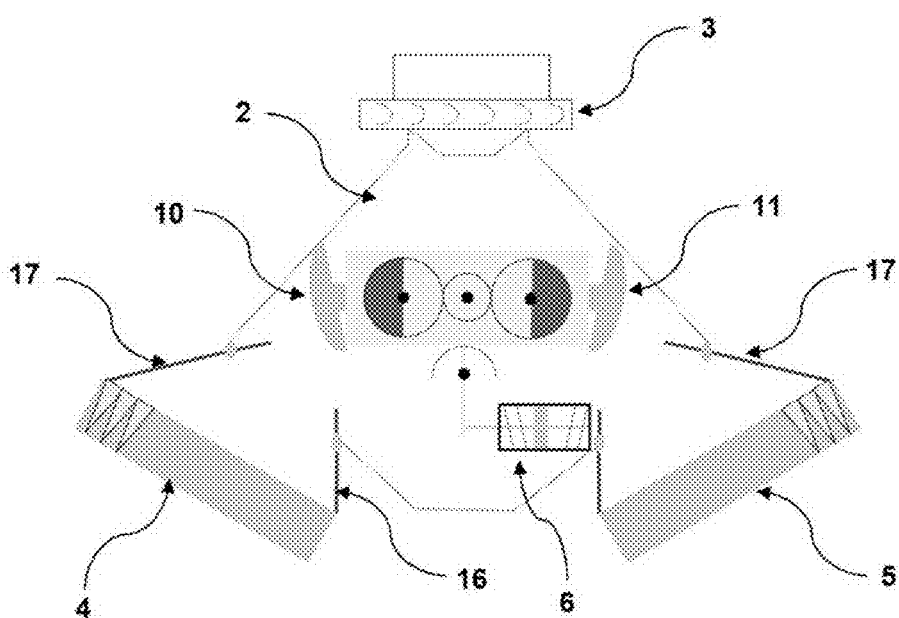
FIG. 4 shows a view of a preferred embodiment of the invention, in particular an arrangement of the de-dusting unit and the filters according to the rotary solution.

FIG. 4 shows a representation of a preferred embodiment of the provided arrangement of the de-dusting unit (1) and the filters (4 and 5) according to a so-called rotary solution. In the context of the rotary solution, the de-dusting unit (1) is designed to carry out a rotational movement about a point of rotation (18). In this case, this movement is preferably brought about by the displacement module (6) of the vacuuming device. In the exemplary embodiment of the invention that is represented in FIG. 4, the de-dusting unit (1) is connected to the second filter (5) by way of the displacement module (6) and the connecting means (18). In particular, the de-dusting unit (1) is connected to an inner side component (16) of the second filter (5). Preferably, the inlets (12 and 13) of the filters (4 and 5) are formed by side components (16 and 17). These side components (16) may lie opposite one another and be formed substantially parallel to one another. The other side component (17) respectively of the filter inlets (12, 13) may preferably be referred to for the purposes of the invention as the outer side component (17). Within the rotary solution, the filters (4 and 5) may be arranged obliquely in relation to one another in the vacuuming device. For example, the second filter (5) may form an angle of inclination alpha with an imaginary horizontal plane, whereas the first filter may form an angle of inclination beta with the imaginary horizontal plane, the angles of inclination preferably being linked together by way of the relationship «beta=180°−alpha».

FIG. 4 shows a middle position of the de-dusting unit (1) within the vacuum chamber (1) of the vacuuming device, in which both filters (4 and 5) are open with respect to the vacuum chamber (2). The suction flow can consequently flow through both filters (4 and 5) and can be advantageously cleaned by the filters (4 and 5).

Figure 5:
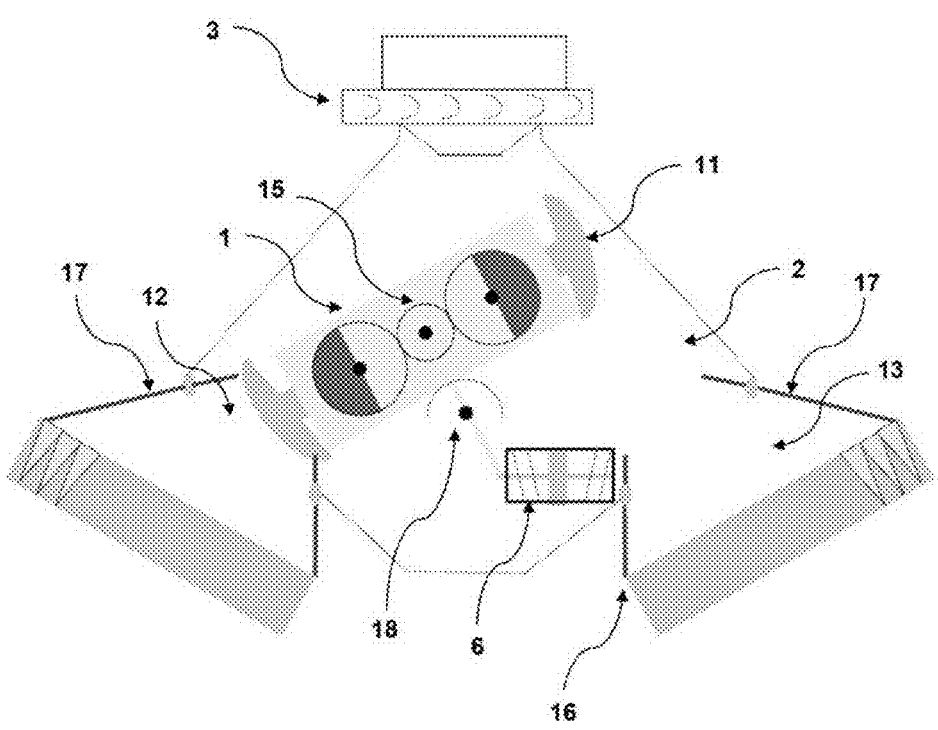
FIG. 5 shows a representation of a first de-dusting position of the de-dusting unit, in which the first filter is de-dusted.

FIG. 5 shows a de-dusting unit (1) in a first de-dusting position, in which the first filter (4) is de-dusted, wherein, according to a rotary solution, the filters (4 and 5) are preferably arranged obliquely in relation to one another. The first tappet (10) in this case closes the first filter inlet (12), this isolation preferably being achieved by a form fit. For this purpose, a connection is preferably formed between the first tappet (10) and the side components (16 and 17), which form the inlet (12) of the first filter (4).

Figure 6:
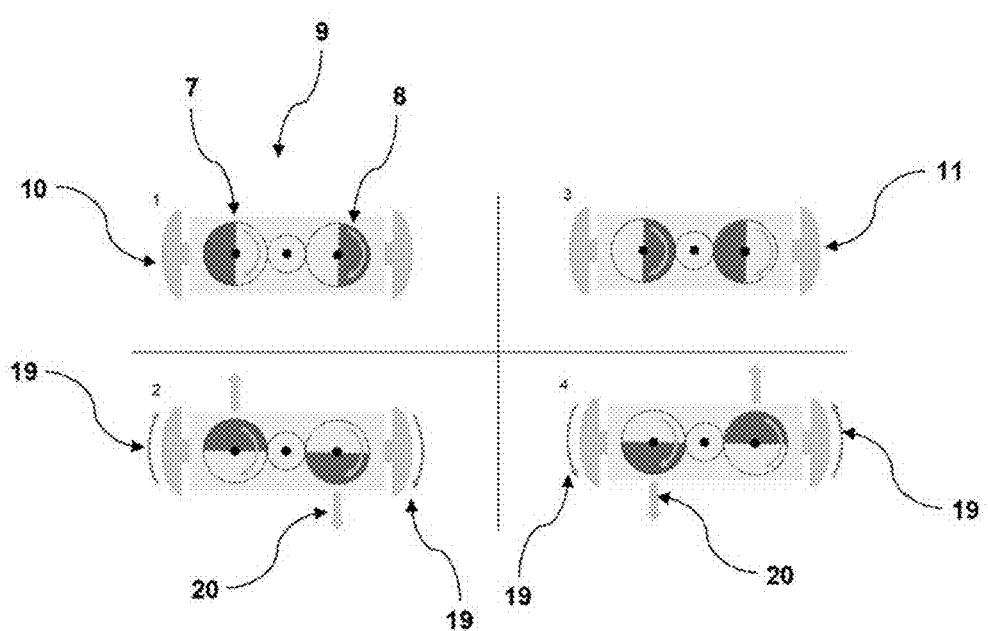
FIG. 6 shows a schematic representation of possible eccentric positions and arrangements.

FIG. 6 shows a schematic representation of possible eccentric positions and arrangements within the vacuum chamber (2) of the vacuuming device. In particular, FIG. 6 shows four customary positions that the eccentrics (7, 8) of the eccentric unit (9) of the de-dusting unit (1) can assume. Sub-figure 1 (top left) shows the configuration of the eccentrics (7, 8) "longitudinal axis outward", in which the centrifugal forces (20) of the eccentrics (7, 8) are preferably directed outwardly in the same axis, so that they advantageously compensate for one another or cancel one another out. Sub-figure 2 (bottom left) shows the configuration of the eccentrics (7, 8) "transverse axis clockwise", in which the centrifugal forces (20) of the eccentrics (7, 8) advantageously produce or initiate a torque (19) in the clockwise direction, the torque (19) preferably also being referred to for the purposes of the invention as the rotational force or de-dusting force. Sub-figure 3 (top right) shows the configuration of the eccentrics (7, 8) "longitudinal axis inward", in which the centrifugal forces (20) of the eccentrics (7, 8) are preferably directed inwardly in the same axis, so that they once again advantageously compensate for one another. Sub-figure 4 (bottom right) shows the configuration of the eccentrics (7, 8) "transverse axis counterclockwise", in which the centrifugal forces (20) of the eccentrics (7, 8) are arranged in relation to one another in such a way that a torque (19) in the counterclockwise direction is produced or initiated, it being possible for the torque (19) to be used for producing the oscillating movement and for de-dusting the filters (4, 5) of the vacuuming device.

LIST OF REFERENCE CHARACTERS

1 De-dusting unit
2 Vacuum chamber
3 Turbine
4 First filter
5 Second filter
6 Displacement module
7 First eccentric
8 Second eccentric 9 Eccentric unit
10 First tappet
11 Second tappet
12 First filter inlet
13 Second filter inlet
14 Elastic suspension
15 Drive device for the eccentrics
16 Inner side component
17 Outer side component
18 Connecting means/point of rotation
19 Torque
20 Centrifugal forces
alpha Angle of inclination of the second filter
beta Angle of inclination of the first filter

The invention claimed is:

1. A vacuuming device, comprising:
a vacuum chamber (2), wherein the vacuum chamber (2) is delimited by a turbine (3), a first filter (4), and a second filter (5); and
a single de-dusting unit (1) disposed in the vacuum chamber (2), wherein the single de-dusting unit (1) comprises:
a single displacement module (6), wherein the single displacement module (6) is an actuator that moves the single de-dusting unit (1) back and forth within the vacuum chamber (2) between a first de-dusting position, in which the single de-dusting unit (1) is exclusively in contact with the first filter (4), and a second de-dusting position, in which the single de-dusting unit (1) is exclusively in contact with the second filter (5), such that one of the first and second filters (4, 5) at a time is isolated from a suction flow and such that a mechanically produced oscillating movement of the single de-dusting unit (1) is transmitted to the isolated filter (4, 5);
wherein the oscillating movement produced by the single de-dusting unit (1) is transmitted to the first filter (4) when the single de-dusting unit (1) is in the first de-dusting position;
wherein the oscillating movement produced by the single de-dusting unit (1) is transmitted to the second filter (5) when the single de-dusting unit (1) is in the second de-dusting position.

2. The vacuuming device as claimed in claim 1, wherein the single de-dusting unit (1) includes two eccentrics (7, 8) which produce the oscillating movement by a rotational movement of the two eccentrics (7, 8).

3. The vacuuming device as claimed in claim 2, wherein the single de-dusting unit (1) includes an eccentric unit (9) that holds the two eccentrics (7, 8).

4. The vacuuming device as claimed in claim 2, wherein the rotational movement of the two eccentrics (7 and 8) is in a same direction.

5. The vacuuming device as claimed in claim 1, wherein the single de-dusting unit (1) has a first tappet (10) and a second tappet (11) which form a lateral termination of the single de-dusting unit (1), wherein a first inlet (12) of the first filter (4) is sealable off by the first tappet (10), and wherein a second inlet (13) of the second filter (5) is sealable off by the second tappet (11).

6. The vacuuming device as claimed in claim 5, wherein the first and second inlets (12, 13) are formed by respective first and second side components (14, 15).

7. The vacuuming device as claimed in claim 5, wherein the single de-dusting unit (1) is disposed between the first and second filters (4, 5).

8. The vacuuming device as claimed in claim 7, wherein the first and second tappets (10 and 11) are disposed parallel to an eccentric unit (9) of the single de-dusting unit (1).

9. The vacuuming device as claimed in claim 7, wherein the first and second filters (4, 5) are disposed parallel to one another.

10. The vacuuming device as claimed in claim 5, wherein the first and second tappets (10 and 11) are disposed tipped with respect to an eccentric unit (9) of the single de-dusting unit (1).

11. The vacuuming device as claimed in claim 1, wherein the single de-dusting unit (1) is disposed above the first and second filters (4, 5).

12. The vacuuming device as claimed in claim 11, wherein the first and second filters (4, 5) are disposed obliquely in relation to one another.

13. The vacuuming device as claimed in claim 1, wherein the actuator comprises an electromagnet.

14. The vacuuming device as claimed in claim 1, wherein the actuator comprises spring elements.

15. A vacuuming device, comprising:

a vacuum chamber (2), wherein the vacuum chamber (2) is delimited by a turbine (3), a first filter (4), and a second filter (5);

a single de-dusting unit (1) disposed in the vacuum chamber (2), wherein the single de-dusting unit (1) comprises an eccentric unit (9) with two eccentric (7,8) and comprises a first tappet (10) and a second tappet (11); and a displacement module (6), wherein the single de-dusting unit (1) is laterally movable back and forth within the vacuum chamber (2) by the displacement module (6) such that one of the first and second filters (4, 5) at a time is isolated from a suction flow and such that a mechanically produced oscillating movement of the single de-dusting unit (1) is transmitted to the isolated filter (4, 5);

wherein the first tappet (10) and the second tappet (11) form respective lateral terminations of the single de-dusting unit (1) such that a first inlet (12) of the first filter (4) is sealable off by the first tappet (10) when the single de-dusting unit (1) is laterally moved to a first de-dusting position within the vacuum chamber (2) by the displacement module (6) and wherein a second inlet (13) of the second filter (5) is sealable off by the second tappet (11) when the single de-dusting unit (1) is laterally moved to a second de-dusting position within the vacuum chamber (2) by the displacement module (6);

wherein the two eccentrics (7, 8) are disposed between the first tappet (10) and the second tappet (11);

wherein the two eccentrics (7, 8) produce the oscillating movement that is transmitted to the first filter (4) when the first filter (4) is isolated and to the second filter (5) when the second filter (5) is isolated by a rotational movement of the two eccentrics (7, 8) in a same direction, but with an offset of 180° in relation to one another;

wherein the oscillating movement produced by the two eccentrics (7,8) is transmitted to the first filter (4) when the first filter (4) is isolated by the first tappet (10);

wherein the oscillating movement produced by the two eccentrics (7,8) is transmitted to the second filter (5) when the second filter (5) is isolated by the second tappet (11).

* * * * *